Patented Feb. 17, 1942

2,273,196

UNITED STATES PATENT OFFICE 2,273,196

PROCESS FOR THE PREPARATION OF USCHARIN AND USCHARIDIN

Gerhard Hesse, Marburg-on-the-Lahn, Germany, assignor to the firm C. H. Boehringer Sohn, Nieder-Ingelheim-on-the-Rhine, a firm of Germany No Drawing. Application January 19, 1939, Serial No. 251,740. In Germany January 22, 1938

14 Claims. (Cl. 260—210)

This invention relates to the preparation of uscharin and uscharidin, new cardiac substances, from the milky juice of Calotropis species.

It is known to precipitate calotropin in the crystallized state from the dried plant material of *Calotropis procera*. On the other hand, it hitherto has not been known that therapeutically valuable substances could be obtained, in pure state, from the milky juice or latex of Calotropis species.

It has now been found that a new cardiac substance, a glucoside which I have designated by the name, uscharin, is present in the milky juice of Calotropis species and can be isolated as a substantially pure product which is different from the calotropin obtained from the drug. It also has been found that another cardiac substance, uscharidin, may be obtained by hydrolysis of uscharin. For the preparation of uscharidin according to this invention, the uscharin is split by treatment with acidic splitting agents, including acids or acid salts, at ordinary or elevated temperatures. Acids especially suitable for this purpose have been found to be mineral acids, e. g., sulfuric acid, hydrochloric acid, fluorboric acid, perchloric acid, or organic sulfonic acids, e. g., benzenesulfonic acid, toluenesulfonic acid, alkyl sulfuric acids, and the like. Dilute mineral acids or water-soluble acid salts, e. g., potassium bisulfate, sodium bisulfate, sodium bisulfite, and the like, may be used with special advantage. These acids are preferably employed in alcoholic or aqueous-alcoholic solution, for which methyl alcohol, ethyl alcohol, or other low-boiling aliphatic alcohols may be used.

When uscharin, which contains nitrogen and sulfur atoms, is split, these atoms are split off from the molecule. The uscharidin produced generally froths at about 210° C., solidifies again upon further heating, and finally decomposes at about 290° C. It probably still contains the glucoside component. Owing to its superior crystallizability, it can easily be obtained in a pure state, and it shows better stability and greater resistance to acids than does uscharin. Uscharidin is more soluble than uscharin in alcohol, and its solubility in water-alcohol mixtures is 5 to 10 times greater than that of uscharin for the mixture-ratios coming into consideration for its application. Its pharmacological efficacy resembles that of strophanthin. Uscharidin is administered per se or as a complex compound, e. g., with desoxycholic acid.

Uscharidin may be prepared either from crystallized uscharin or from an amorphous, crude product containing uscharin, obtained in the preparation of uscharin from the milky juice of Calotropis species. The milky juice itself, or the mother-liquors obtained in the preparation of uscharin and still containing uscharin, may also be processed directly.

The uscharidin is extracted from the acid, aqueous or aqueous-alcoholic solution produced on hydrolysis of the uscharin, using solvents nonmiscible with dilute alcohol, such as chloroform, carbon tetrachloride, ethyl acetate, or the like, and the solution obtained is concentrated until crystallization sets in. If a less pure uscharin or an amorphous crude product is used as initial material, it is then recommended that, in order to separate impurities and undesired accompanying substances, the uscharidin crystallized from chloroform or carbon tetrachloride shall be taken up in a suitable solvent, e. g., acetone, and subjected to chromatographic adsorption over aluminium oxide, active carbon, or the like. Details of the procedure of chromatographic adsorption may be found in Gattermann, Die Praxis des organischen Chemikers, 1937, pp. 15 and 16. The solution obtained, after addition of absolute alcohol, is then concentrated in vacuo, whereupon the uscharidin crystallizes out in colorless leaflets. The introduction of one or more steps of chromatographic adsorption, for the purpose of purification, into the process is always to be recommended when uscharin of indefinite purity is employed as the initial material.

The process may be carried out so that the accompanying substances are separated from crude concentrates of uscharin by fractional crystallization or by chromatographic adsorption, and the whole mother-liquor containing the uscharin may then be hydrolysed.

The preparation of the uscharin from the milky juice of Calotropis species may be carried out by the usual methods of working up such substances. It has been found advantageous to preserve the milky juice immediately after it is obtained by the addition of antiseptic substances such as toluene, thymol, chloroform, phenol, benzoic acid, salicylic acid, copper salts, mercury salts, and the like, or by the addition of neutral salts such as ammonium sulfate, sodium chloride, potassium chloride, ammonium chloride, sodium or potassium nitrate, etc.

It is further recommended that temperatures above 40° C. shall be avoided during processing, and that during concentration of the serum, which ordinarily shows a weakly alkaline reaction, a weakly acid reaction shall be maintained.

The process according to the invention may, for example, be carried out by adding about an equal volume of an organic solvent miscible with water, e. g., ethyl alcohol, methyl alcohol, acetone, and the like, to the milky juice obtained from *Calotropis procera* and *Calotropis gigantea*, and preserved; the semi-solid mass precipitated, which has little cardiac action, is separated. Alcoholic lead acetate solution is added to the remaining liquor until no further precipitation occurs. Frothing during the subsequent evaporation is thereby obviated and a weakly acid reaction is produced by the liberated acetic acid. After the precipitate produced by the lead acetate solution, containing impurities such as tannins, albuminous substances, saponins, and the like, has been separated, the solution is evaporated under reduced pressure and at temperatures below 40° C. to half the initial volume of the milky juice, and, together with some precipitate formed, is repeatedly extracted with a suitable organic solvent nonmiscible with water, e. g., chloroform, amyl alcohol, ethyl acetate, butyl acetate. The brown chloroform solution is deacidified with a little 2N-soda solution, washed with a little water, and dried. By precipitation with liquids in which the cardiac poisons are difficulty soluble, e. g., petroleum ether or ether, or, more simply, by evaporation of the solution in vacuo, a still amorphous, crude product is obtained. This concentrate contains uscharin and other therapeutically active substances, and can, if desired, be further processed directly to uscharidin.

By dissolving this concentrate in solvents which do not dissolve too little uscharin in the cold, e. g., chloroform, ethyl acetate, dioxan, or the like, perhaps with brief warming, a brownish crystallized product is obtained. It is preferably recrystallized by dissolving it in chloroform, ethyl acetate, dioxan, or the like, filtering the solution through a short column of aluminium oxide, aluminium hydroxide, magnesium oxide, active carbon, silica gel, bleaching earths, calcium carbonate, and the like, in order to separate colored impurities, and then adding alcohol to the solution and evaporating the chloroform or the like out of the mixture under reduced pressure. The uscharin thereby crystallizes out in the pure state. It is a glucoside containing nitrogen and sulfur, and having an action on the heart similar to that of strophanthin. The decomposition point, on rapid heating, is about 280° C.

If the milky juice has been preserved with neutral salts or if said salts have been added in sufficient quantities uscharin, upon addition of alcohol, passes into the precipitate. In order to obtain it the following procedure, for example, may be followed. Coagulation is effected with a little alcohol (10 to 20 per cent), the precipitate is dried, and the resin is brought into solution by extraction with suitable organic solvents which do not dissolve uscharin. Petroleum ether, pentane, and ether, for example, may be used to advantage. The mass, after this preliminary purification, is subsequently extracted with solvents for uscharin, e. g., chloroform. This extraction is continued as long as cardiac poisons can still be detected in the extract. The chloroform solution is concentrated and worked up, as described above, to yield uscharidin.

Occasionally, not the sulfur-containing substance, but a mixture of accompanying substances crystallizes first from the solution of the concentrate. In this case, the mother liquor is filtered through a layer of a suitable adsorbent, e. g., aluminium oxide, animal charcoal, or the like, and the filtrate is made to crystallize.

*Uscharin.*—After recrystallization from acetone, it was obtained in colorless, prismatic rods, frequently tapering on one side so as to give chisel-like forms. Specific rotation $[\alpha]_D = +29°$. Decomposition point 265° C.; higher, if heated quickly. Legal-test (color reaction with sodium nitroprusside and alkali) positive. Uscharin produces with plumbite solution, after prolonged boiling, a dark coloration owing to lead sulfide being precipitated, a very reliable, although not a very sensitive test.

The substance, when free from solvent, upon analysis gives the following average values:

$C = 63.3\%$  $H = 7.2\%$  $N = 2.4\%$  $S = 5.5\%$

Uscharin, with water, alcohol, dioxan, etc., forms rather stable solvent compounds.

*Uscharidin.*—Crystallizes in colorless leaflets. It froths at about 210° C., but upon further heating solidifies again and does not decompose, with the production of a dark color and vigorous frothing, until 290° C. The first melting point (possibly due to the evolution of solvent) is not observed regularly. Legal-test positive. Plumbite-test for sulfur negative. Free from nitrogen.

The compound, when entirely free from solvent, has the following composition (average of 3 analyses).: $C = 65.2\%$, $H = 7.55\%$.

It absorbs water from moist air. When saturated with water, the compound contains $C = 63.2\%$, $H = 7.4\%$.

Uscharidin gives an oxime (hexagonal leaflets from dioxan) which decomposes at 257° C.

The following examples will further illustrate the preparation of uscharidin from pure uscharin or from crude concentrates containing uscharin, but the invention is not restricted to the acids, solvents, concentrations, and working temperatures given in these examples.

*Example 1*

10 grams of uscharin in 300 cc. of methanol and 300 cc. of 2N-sulfuric acid were refluxed for half an hour. After cooling, the solution was extracted with an organic solvent non-miscible with the dilute methyl alcohol, e. g., chloroform or carbon tetrachloride. The extract was concentrated to crystallize. 5.5 grams of uscharidin were obtained.

*Example 2*

1 gram of uscharin was suspended in 10 cc. of alcohol, and brought into solution by adding 25 cc. of 70 per cent sulfuric acid. The reaction mixture was kept at 30 to 40° C. for 48 hours. The solution was then diluted by adding small pieces of ice, and the organic substance was extracted with chloroform. The chloroform solution was washed, dried, and concentrated. The residue was crystallized from alcohol.

*Example 3*

A crude concentrate containing uscharin was hydrolysed as described in Examples 1 or 2. The chloroform extract was evaporated to dryness, and the residue dissolved in acetone. In order to purify the solution it was filtered through a short column of aluminium oxide. After adding absolute alcohol, the filtrate was concentrated in vacuo whereby uscharidin crystallized in colorless leaflets.

I claim:

1. The process of preparing the cardiac substance uscharidin which comprises obtaining the glucoside uscharin from the milky juice of Calotropis species, splitting said uscharin by treating it with an acidic splitting agent, and isolating uscharidin from the mother liquors.

2. The process according to claim 1 characterised in that crystallized uscharin is brought into solution and split by means of an acidic splitting agent.

3. The process according to claim 1 characterised in that the solutions obtained from amorphous uscharin are split by means of an acidic splitting agent.

4. The process according to claim 1 characterised in that uscharin which is contained in the mother-liquors of the process for obtaining uscharin is split by means of an acidic splitting agent.

5. The process according to claim 1 in which the acidic splitting agent comprises an aqueous mineral acid.

6. The process according to claim 1 in which the acidic splitting spitting agent comprises an organic sulfonic acid.

7. The process according to claim 1 in which the acidic splitting agent comprises a water-soluble acid salt.

8. The process according to claim 1 in which the acidic splitting agent comprises an aqueous mineral acid in solution in a low-boiling aliphatic alcohol.

9. The process according to claim 1 which comprises isolating uscharidin contained in the mother-liquor after the splitting operation, by means of organic solvents non-miscible with aqueous alcohol.

10. The process according to claim 1 characterised in that uscharidin isolated from the mother-liquors is subsequently purified by chromatographic adsorption.

11. The process according to claim 1 which comprises adding preservatives to the milky juice and working it up at temperatures below 40° C.

12. A process for the isolation of uscharin which comprises admixing the milky juice of Calotropis species with alcohol, separating the precipitate, adding alcoholic lead acetate solution to the remaining liquor, removing the lead precipitate, evaporating the solution in vacuo, extracting it by means of an organic solvent for the uscharin which is non-miscible with water, evaporating the solvent, and recrystallizing the residue so obtained from organic solvents.

13. As a new substance, uscharidin, a colorless, crystallized substance which is soluble in alcohol, acts on the heart in a manner similar to that of strophanthin, and decomposes at about 290° C.; said substance, when dried and subjected to elementary analysis, yielding a carbon content averaging about 65.2 percent and a hydrogen content averaging about 7.5 percent.

14. As a new substance, uscharin, a colorless, crystallized glucoside which contains sulfur and nitrogen, acts on the heart in a manner similar to that of strophanthin, and decomposes at 265° C.; said substance, when dried and subjected to elementary analysis, yielding a carbon content averaging about 63.3 per cent, a hydrogen content averaging about 7.2 per cent, a nitrogen content averaging about 2.4 per cent, and a sulphur content averaging about 5.5 per cent.

GERHARD HESSE.

CERTIFICATE OF CORRECTION.

February 17, 1942.

Patent No. 2,273,196.

GERHARD HESSE.

It is hereby certified that error appears in the printed specification of the above numbered patent requiring correction as follows: Page 1, first column, line 17, before "cardiac" insert --new--; page 3, first column, line 23, claim 6, strike out "spitting"; and that the said Letters Patent should be read with this correction therein that the same may conform to the record of the case in the Patent Office.

Signed and sealed this 28th day of April, A. D. 1942.

Henry Van Arsdale,
Acting Commissioner of Patents.

(Seal)